(12) United States Patent
Hediger et al.

(10) Patent No.: US 9,063,890 B2
(45) Date of Patent: Jun. 23, 2015

(54) EXECUTING PROGRAM TO PROTECTED MEMORY IN TRANSPONDER USING WIRELESS BASE STATION

(75) Inventors: Ralf Hediger, Munich (DE); Volkhard Mueller, Wolfersdorf (DE)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 13/038,960

(22) Filed: Mar. 2, 2011

(65) Prior Publication Data

US 2011/0153970 A1 Jun. 23, 2011

Related U.S. Application Data

(63) Continuation of application No. 11/081,543, filed on Mar. 17, 2005, now abandoned.

(30) Foreign Application Priority Data

Mar. 17, 2004 (DE) .......................... 10 2004 013 176

(51) Int. Cl.
*G06F 12/00* (2006.01)
*G06F 12/14* (2006.01)

(52) U.S. Cl.
CPC ........ *G06F 12/1441* (2013.01); *G06F 12/1458* (2013.01)

(58) Field of Classification Search
USPC ........................................................ 711/163
See application file for complete search history.

(56) References Cited

U.S. PATENT DOCUMENTS

| | | | |
|---|---|---|---|
| 4,677,546 A | 6/1987 | Freeman | |
| 6,542,981 B1 | 4/2003 | Zaidi | |
| 6,651,171 B1 * | 11/2003 | England et al. | 713/193 |
| 6,742,094 B2 * | 5/2004 | Igari | 711/163 |
| 6,885,337 B2 | 4/2005 | Jenbro | |
| 7,079,656 B1 | 7/2006 | Menzel | |
| 7,607,026 B2 * | 10/2009 | Squibbs et al. | 713/193 |
| 2003/0140238 A1 | 7/2003 | Turkboylari | |
| 2004/0030907 A1 | 2/2004 | Dariel | |
| 2004/0043788 A1 * | 3/2004 | Mittal | 455/558 |
| 2004/0054911 A1 * | 3/2004 | Chennakeshu et al. | 713/181 |
| 2004/0078536 A1 | 4/2004 | Chen | |
| 2004/0255145 A1 | 12/2004 | Chow | |
| 2006/0168658 A1 * | 7/2006 | Kallio | 726/21 |
| 2007/0022243 A1 | 1/2007 | Rudelic | |
| 2007/0050622 A1 * | 3/2007 | Rager et al. | 713/168 |
| 2007/0061581 A1 | 3/2007 | Holtzman | |

FOREIGN PATENT DOCUMENTS

| | | |
|---|---|---|
| DE | 699 08409 | 6/2000 |
| DE | 101 30 124 | 1/2003 |
| EP | 0 703 529 | 3/1996 |

* cited by examiner

*Primary Examiner* — Aimee Li
*Assistant Examiner* — Prasith Thammavong
(74) *Attorney, Agent, or Firm* — Fish & Richardson P.C.

(57) ABSTRACT

An apparatus and a method is provided for the execution of a program by a program-controlled device, in which the program-controlled device receives instructions and automatically executes the program if it receives an access instruction for accessing a protected memory area. The invention further relates to a programmable transponder containing at least one such program-controlled device.

20 Claims, 2 Drawing Sheets

EXECUTING PROGRAM TO PROTECTED MEMORY IN TRANSPONDER USING WIRELESS BASE STATION

This application is a continuation, under 35 U.S.C. §120, of U.S. patent application Ser. No. 11/081543, filed 17 Mar. 2005, which claims the benefit, under 35 U.S.C. §119(a), of German Patent Application No. DE 102004013176.7-53, filed 17 Mar. 2004.

BACKGROUND OF THE INVENTION

1. Field of the Invention

The present invention relates to a method and an apparatus for the execution of a program by a program-controlled device.

2. Description of the Background Art

Program-controlled devices of this type may be designed for example as a microprocessor, microcontroller, signal processor or the like. The construction of such program-controlled devices has been known in many cases in innumerable embodiments for many years, and so it will not be discussed in any greater detail. A processor will generally be assumed hereinafter as an example of a program-controlled device.

Every processor has its own instruction set, the scope of which is predefined by an available bit width for instructions of the processor. If the bit width for instructions is two bits, for example, then a maximum of four different instructions are available to the corresponding processor.

Therefore, extending the instruction set of a processor generally also requires increasing the bit width provided for instructions, the so-called instruction bit width, unless the available instruction space of the processor is not yet fully exhausted. This latter may occur for example in the case of complex microprocessors having a large instruction bit width.

However, if the instruction space is fully exhausted, then it is not possible to implement the functionality of a processor only by extending the instruction scope without a circuitry intervention in the integrated circuit of the processor. Such circuitry changes exhibit inherent serious disadvantages, however, e.g., they are usually also accompanied by an enlargement of the chip area of the processor, a result of which being that the integrated circuit representing the processor is significantly more expensive to produce. This is at contrary with endeavoring to produce integrated circuits and corresponding processors smaller and smaller and thus ever more cost-effectively.

Moreover, interventions in the circuitry of a processor also always entail the risk of errors creeping in, which risk reduces the design security and which errors usually have to be eliminated in a very complicated manner. This is the case particularly with optimized processors, which have not been exclusively developed by automatic development tools for the chip design, but rather have been optimized as if it were "manually".

In order to avoid the limitations outlined above, and the associated disadvantages, the functionality of an integrated circuit, which has hitherto been provided by hardware elements such as processors or corresponding electronic circuit, is increasingly being moved into the program or the software of the corresponding hardware or of the processor.

In the case of smaller circuit arrangements or devices such as programmable transponders, for example, this constitutes a significant problem, because their chip areas and thus also the memory space available for software are very limited. Such programmable transponders are also referred to as a "tag" since they are often used as if they were markers or labels for identifying products. A programmable transponder or tag typically includes a microchip and a transmitting/receiving antenna through which data can be interchanged, for example, with base stations bidirectionally by radio.

However, the radio transmission link used for data transmission between the base station and the transponder is of a very narrowband nature. Moreover, the transmission times are very limited temporally.

In order to be able to comply with these boundary conditions, the processors used for such programmable transponders have instruction sets having a very small bit width of merely two bits, for example. The four different instructions available as a result of this have regularly already been allocated, so that an intervention in the integrated circuit of the transponder is necessary for the implementation of at least one additional instruction. Without such a circuitry change, it is not possible to implement at least one additional instruction in the case of currently available transponders having a small bit width. This is a state of affairs which, understandably, should be avoided.

SUMMARY OF THE INVENTION

It is therefore an object of the present invention to provide a method and an apparatus for the execution of a program by a processor in which it is not necessary to extend an instruction set that is already present for the purpose of introducing new instructions.

In an embodiment of the present invention, new or additional instructions are created for an execution of a program from existing instructions, which access protected memory areas, which are actually forbidden during normal operation of the processor. In other words, according to the invention, it is thus possible to use predefined access instructions to protected memory areas for the automatic execution of a program by a processor, thereby enabling the implementation of a further instruction.

The invention proves to be particularly advantageous in those applications in which there is an increased need for security. In applications of this type, a type of authentication sequence or login procedure is generally carried out prior to the actual data transmission. These methods are intended to ensure that all subscribers participating in a communication are actually authorized to communicate among one another. Special instructions such as "start authentication" have conventionally been provided for such authentication sequences or login procedures, which instructions have been sent from a base station to a transponder, for example. A corresponding circuit for the authentication or login process is then activated in the transponder.

In the case of the base station, the functionality corresponding to the abovementioned circuit of the transponder has been realized in software since sufficient memory space and processor capacity are available there. Through an embodiment of the present invention, it is now possible, in a very elegant but nevertheless very effective manner, to extend existing transponders which actually have a very limited instruction space with regard to their instruction bit width, whereby the instruction space already being fully utilized, in order to make available the additional functionality of an authentication and/or a login procedure, without substantial circuitry changes. This is effected according to an embodiment of the invention, for example, by realizing substantial parts of the new instruction on the transponder in the form of software. Since such program parts or instructions which are present anyway in the software of the transponder are accessed here, the memory space requirement for this additional functionality is very small. An enlargement of the space requirement of the corresponding integrated circuit is therefore negligibly small or ideally even nonexistent.

In concrete terms, an embodiment of the invention relates to a method for the execution of a program by a processor, in which the processor receives instructions and automatically executes the program if it receives an instruction for accessing a protected memory area. The processor thus interprets such an access instruction as a type of start command for the program. This method is preferably used for extending instructions in programmable transponders or tags.

The program may, for example, can execute an authentication sequence between a first communication party and a second communication party. In particular, the first communication party can be designed, for example, as a base station and the second communication party can be designed as a transponder having the processor and also the protected memory area.

The program may also execute a login procedure of a first communication party at a second communication party. For example, the login procedure may be executed if a base station wishes to register or log on to a transponder.

Preferably, the protected memory area has at least one secret key. The instruction for accessing the protected memory area can include an address of the at least one secret key. In such a case, the processor merely has to decode the combination of access instructions and the special memory address of the at least one secret key for the automatic execution of the program mentioned. Such decoding can be implemented in a simple manner in software that is executed by the processor. Thus, before the processor outputs an error message on account of the access to the protected memory area, the corresponding access instruction is intercepted and decoded in accordance with the invention and interpreted as a new instruction.

The protected memory area may also include a predefined address range of a memory. In this case, the instruction for accessing the protected memory area includes at least one address of the predefined address range.

The instruction for accessing the protected memory area can be designed as a read command and/or as a write command.

In a further embodiment, an apparatus is provided for the execution of a program by a program-controlled device, which is designed for receiving instructions and has an instruction processor, which is designed to automatically execute the program if the processor receives an instruction for accessing a protected memory area. The instruction processor may either be realized by simple circuitry measures or else be implemented in software. The program-controlled device may be designed for example as a microprocessor, as a microcontroller, as a signal processor, etc. However, a hardwired implementation of the program-controlled device would also be conceivable, for example, by an FPGA circuit or a PLD circuit.

The program is preferably designed in such a way so as to execute an authentication sequence between a first communication party and a second communication party, for example, between a base station and a transponder.

The program may also be designed in such a way as to execute a login procedure of a first communication party to a second communication party, for example, a base station to a transponder.

Preferably, the protected memory area has at least one secret key. The instruction for accessing the protected memory area can include the address of the at least one secret key.

In a further embodiment, the protected memory area may also include a predefined address range of a memory. In this case, the instruction for accessing the protected memory area can have at least one address of the predefined address range.

Also, the instruction for accessing the protected memory area can be, preferably, designed as a read command and/or as a write command.

In addition, an embodiment of the invention relates to a programmable transponder containing a program-controlled device as described above.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
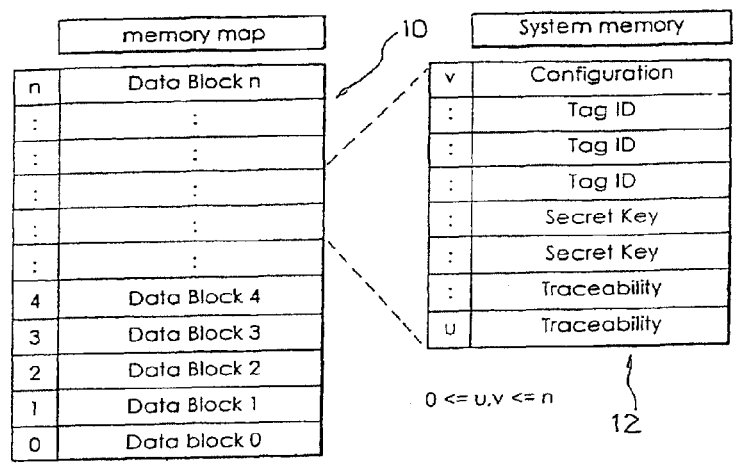
FIG. 1 shows a memory map of a programmable transponder (tag) comprising a system memory with secret keys, according to an embodiment of the invention.

In the figures of the drawing, unless specified otherwise, identical or functionally identical elements, features and signals have been provided with the same reference symbols.

FIG. 1 shows a memory map of a programmable transponder (tag) that includes a system memory with secret keys. In this case, the reference symbol 10 represents the memory map of the programmable transponder—hereinafter referred to as transponder. The memory map 10 includes data blocks, which are identified by 0 to n. Each of the data blocks can have an identical memory size, for example, of 32 bytes. Moreover, a system memory area 12 is provided within the memory map 10, and permits only protected access via an operating system executed by a processor of the transponder.

The system memory area 12 includes configuration settings, which are a unique identification of the transponder ("Tag ID"), memory locations for one or more secret keys, and memory locations for tracing specific processes. The memory addresses 0 to n of the memory map 10 and u to v of the system memory area 12 are specified in each case in the left-hand fields in FIG. 1. In this case, the system memory area 12 comprises a range from the address u to the address v with the boundary conditions u≥0 and v≤n, as a result of which it lies within the memory map 10.

Figure 2:
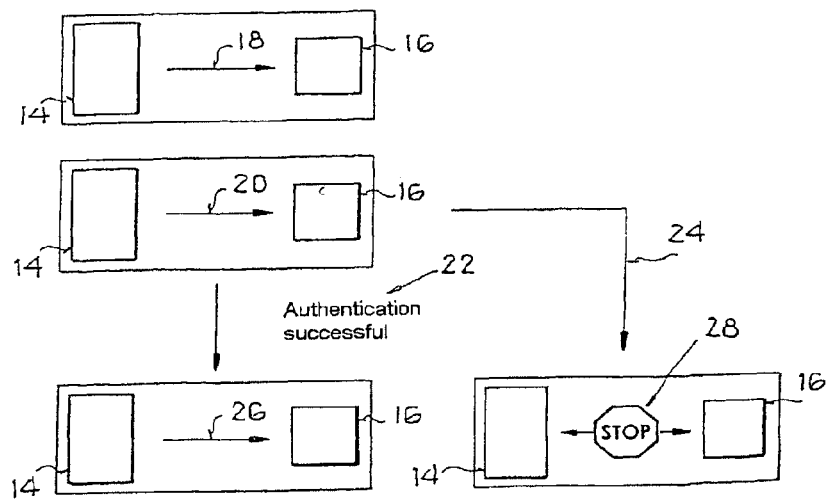
FIG. 2 shows a progression of an authentication sequence between a base station and a transponder, in the course of which the base station authenticates itself at the transponder by execution of a program by a processor arranged within the transponder.

FIG. 2 shows an example of a progression of an authentication sequence between a base station 14 and a transponder 16. FIG. 2 in this case shows the progression of an authentication of the base station 14, also referred to as a read/write device, at a transponder or tag 16. In this case, it should be taken into account that the instruction set of the processor of the transponder 16 does not necessarily have a dedicated instruction for starting the authentication process. Rather, the authentication process can be initiated in the transponder 16, more precisely by the processor of the transponder 16, by execution of an inherently "forbidden" instruction. In this case, a "forbidden" instruction is to be understood, for example, as an instruction that executes an unallowed access to a protected memory area, that is to say to one or more memory addresses of the system memory area 12 illustrated in FIG. 1.

In FIG. 2, the "forbidden" instruction can be a read command 18 for one or more memory addresses of the system memory area 12, which in each case can include a secret key. The processor of the transponder 16 identifies such an instruction as a forbidden access and thereupon starts a routine or procedure 20 which carries out the authentication process. Such a routine or procedure 20 can be stored in the memory of the transponder 16.

After the authentication sequence 20 has been performed, a processor of the transponder 16 ascertains whether the authentication was successful 22 or was not successful 24. If the authentication was successful, a bidirectional communication 26 with reciprocal read/write accesses can be effected between the base station 14 and the transponder 16. By contrast, if the authentication was not successful, then the corresponding communication is automatically terminated 28 by the transponder 16 and/or by the base station 14. It may then be provided that immediately afterward or, if appropriate, after a predefined time period has elapsed, a renewed authentication process is started by the base station 14. In addition or alternatively, it may also be provided that the communication between the base station 14 and the transponder 16 is first completely interrupted once and/or also remains permanently interrupted.

Figure 3:
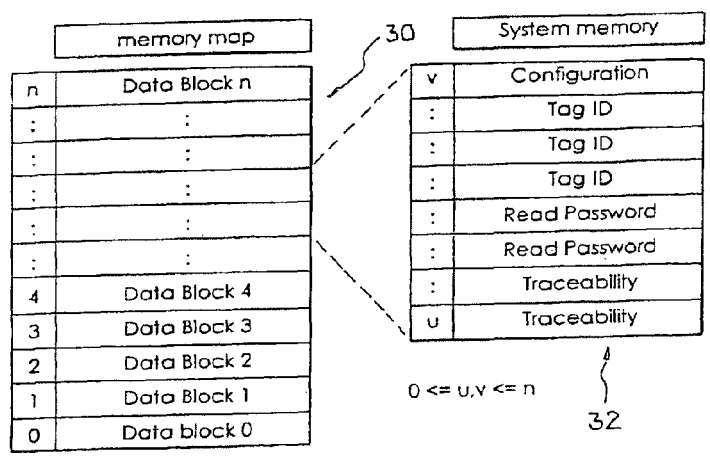
FIG. 3 shows a memory map of a transponder containing a system memory with a read/write password for a login procedure.

FIG. 3 shows, for example, a memory map of a transponder having a system memory with a read/write password for a login procedure. In this case, FIG. 3 shows a similar memory map of a memory of a transponder 16 as that in FIG. 1, although with the difference that, instead of the secret keys, a read password and also a write password are stored in the system memory area 32. The read and write passwords are intended to enable specific memory areas of the memory of the transponder 16 to be read from and written to. The read and write passwords furthermore enable a base station 14 to register at the transponder 16 by a login sequence which, is explained below with reference to FIG. 4.

Figure 4:
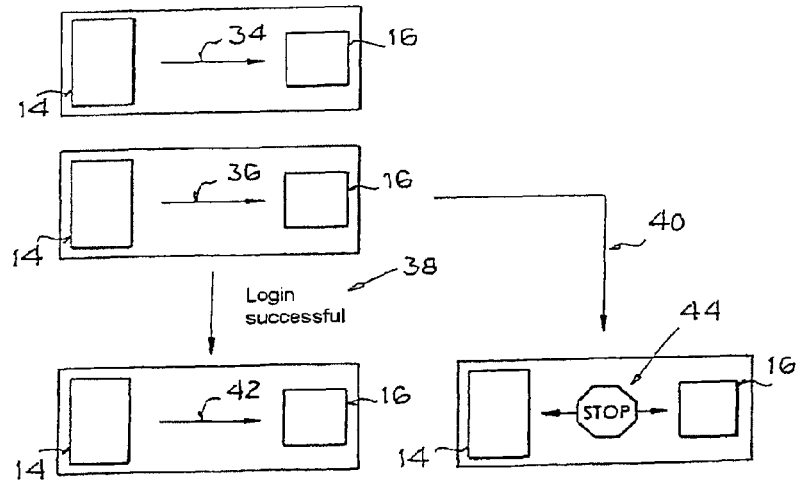
FIG. 4 shows an example of a login sequence, in the course of which a base station registers itself at a transponder by starting a program for the execution based on a login sequence on the transponder.

FIG. 4 shows, for example, a login sequence in the course of which a base station 14 registers itself at a transponder 16 by starting a program for the execution according to the invention of the login sequence on the transponder. In FIG. 4, a base station 14 transmits a read registration command 34 to a programmable transponder 16, through which the transponder 16 is informed by the base station 14 that the base station 14 would like to read data from a protected memory area or system memory area 32 of the transponder 16. The read registration command 34 may be, for example, a read command to a memory cell of the system memory area 32, which the processor of the transponder 16 identifies as an unallowed access.

The processor of the transponder 16 then starts a routine or a procedure 36, which may be stored in the conventional memory or else in the protected memory or system memory area 32 of the transponder memory, and which, upon registration of the base station 14 at the transponder 16, enables the reading and writing of memory addresses of the system memory area 32, that is to say, of the protected memory area of the transponder memory. In the context of this login procedure, the transponder 16 verifies login data which it receives after the read registration command 34 from the base station 14. It compares the received login data with corresponding data (Read Password, Write Password) from the system memory area 32 and identifies the registration request by the base station 14 as successful 38 provided that the data correspond; otherwise, it rejects the registration process as not successful 40.

If the registration process or the login was successful, a normal communication 42 is set up between the base station 14 and the transponder 16, the normal communication 42 enabling read/write accesses to the memory of the transponder 16 by the base station 14. Otherwise, the communication between base station and the transponder is terminated 44 or arbitrary data such as random data, for example, are output by the transponder.

The invention makes it possible to limit the extra outlay on circuitry for implementing a new instruction particularly in the case of transponders whose chip area is very restricted, by generating new instructions by combination of known instructions and addresses of protected memory areas. As a result, neither the already existing instruction structure is changed nor is a change necessary. Changes in already existing base stations are likewise necessary only to a limited extent and can be implemented by software, for example.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:
1. A method comprising:
  receiving, via a wireless transmission from a base station, an access instruction for accessing a protected memory area of a transponder;
  identifying, in response to receiving the access instruction via the wireless transmission from the base station, the access instruction as being a forbidden instruction, a forbidden instruction comprising an instruction operable to execute an unallowed access to a protected memory area, an instruction space of the transponder lacking a dedicated instruction for starting, in response to receiving an access instruction for accessing the protected memory area of the transponder, a first authentication process;
  executing, in response to identifying the access instruction as being a forbidden instruction, a program initiating a second authentication process between the transponder and the base station such that execution of the program is started in the transponder in response to identifying the access instruction as being a forbidden instruction; and
  enabling, based on the second authentication process, communication between the transponder and the base station.

2. The method of claim 1, wherein initiating the second authentication process comprises executing a login procedure.

3. The method of claim 1, wherein:
the protected memory area comprises a secret key; and
the access instruction, received via the wireless transmission from the base station, for accessing the protected memory area comprises an address of the secret key.

4. The method of claim 3, wherein:
the method further comprises decoding a combination of the access instruction and the address of the secret key; and
if the combination is authenticated, then the communication between the transponder and the base station comprises enabling reciprocal read or write access between the transponder and the base station through bidirectional communication.

5. The method of claim 1, wherein:
the protected memory area comprises a predefined address range of a memory; and
the access instruction comprises an address of the predefined address range.

6. The method of claim 1, wherein:
the protected memory area comprises a read or write password;
the method further comprises comparing login data received subsequent to the access instruction with the read or write password; and
if the login data is authenticated, then the communication between the transponder and the base station comprises enabling read or write access to specific areas of the protected memory area.

7. An apparatus comprising:
an antenna for receiving, via a wireless transmission from a base station, an access instruction for accessing a protected memory area of a transponder; and
an instruction processor operable to:
identify, in response to receiving the access instruction via the wireless transmission from the base station, the access instruction as being a forbidden instruction, a forbidden instruction comprising an instruction operable to execute an unallowed access to a protected memory area, an instruction space of the transponder lacking a dedicated instruction for starting, in response to receiving an access instruction for accessing the protected memory area of the transponder, a first authentication process;
execute, in response to identifying the access instruction as being a forbidden instruction, a program initiating a second authentication process between the transponder and the base station such that execution of the program is started in the transponder in response to identifying the access instruction as being a forbidden instruction; and
enable, based on the second authentication process, communication between the transponder and the base station.

8. The apparatus of claim 7, wherein the instruction processor is further operable to execute a login procedure.

9. The apparatus of claim 7, wherein:
the protected memory area comprises a secret key; and
the access instruction, received via the wireless transmission from the base station, for accessing the protected memory area comprises an address of the secret key.

10. The apparatus of claim 9, wherein:
the instruction processor is further operable to decode a combination of the access instruction and the address of the secret key; and
if the combination is authenticated, then the communication between the transponder and the base station comprises enabling reciprocal read or write access between the transponder and the base station through bidirectional communication.

11. The apparatus of claim 7, wherein:
the protected memory area comprises a predefined address range of a memory; and
the access instruction for accessing the protected memory area comprises an address of the predefined address range.

12. The apparatus of claim 7, wherein the protected memory area comprises a read or write password.

13. The apparatus of claim 12, wherein:
the instruction processor is further operable to compare login data received subsequent to the access instruction with the read or write password; and
if login data is authenticated, then the communication between the transponder and the base station comprises enabling read or write access to specific areas of the protected memory area.

14. A circuit operable to:
receive, via a wireless transmission from a base station, an access instruction for accessing a protected memory area of a transponder;
identify, in response to receiving the access instruction via the wireless transmission from the base station, the access instruction as being a forbidden instruction, a forbidden instruction comprising an instruction operable to execute an unallowed access to a protected memory area, an instruction space of the transponder lacking a dedicated instruction for starting, in response to receiving an access instruction for accessing the protected memory area of the transponder, a first authentication process;
execute, in response to identifying the access instruction as being a forbidden instruction, a program initiating a second authentication process between the transponder and the base station such that execution of the program is started in the transponder in response to identifying the access instruction as being a forbidden instruction; and
enable, based on the second authentication process, communication between the transponder and the base station.

15. The circuit of claim 14, wherein initiating the second authentication process comprises executing a login procedure.

16. The circuit of claim 14, wherein:
the protected memory area comprises a secret key; and
the access instruction, received via the wireless transmission from the base station, for accessing the protected memory area comprises an address of the secret key.

17. The circuit of claim 16, wherein:
the circuit is further operable to decode a combination of the instruction for accessing the protected memory area and the address of the secret key; and
if the combination is authenticated, then the communication between the transponder and the base station comprises enabling reciprocal read or write access between the transponder and the base station through bidirectional communication.

18. The circuit of claim 15, wherein the protected memory area comprises a read or write password.

19. The circuit of claim 18, wherein:
the circuit is further operable to compare subsequent login data with the read or write password; and if login data received subsequent to the instruction for access is authenticated, then the communication between the transponder and the base station comprises enabling read or write access to specific areas of the protected memory area.

20. The method of claim 1, wherein the instruction space of the transponder lacks in an instruction set of the transponder the dedicated instruction for starting, in response to receiving an access instruction for accessing the protected memory area of the transponder, the first authentication process, the instruction set stored in an instruction space distinct from a program space of the transponder.

\* \* \* \* \*